(12) United States Patent
Park

(10) Patent No.: US 12,322,824 B2
(45) Date of Patent: Jun. 3, 2025

(54) BATTERY PACK

(71) Applicant: SAMSUNG SDI CO., LTD., Yongin-si (KR)

(72) Inventor: Sanghun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 232 days.

(21) Appl. No.: 16/756,297

(22) PCT Filed: Aug. 16, 2018

(86) PCT No.: PCT/KR2018/009406
§ 371 (c)(1),
(2) Date: Apr. 15, 2020

(87) PCT Pub. No.: WO2019/088417
PCT Pub. Date: May 9, 2019

(65) Prior Publication Data
US 2020/0328397 A1    Oct. 15, 2020

(30) Foreign Application Priority Data
Oct. 30, 2017    (KR) .................... 10-2017-0142563

(51) Int. Cl.
*H01M 50/262*    (2021.01)
*H01M 10/04*    (2006.01)
(Continued)

(52) U.S. Cl.
CPC ..... *H01M 50/262* (2021.01); *H01M 10/0481* (2013.01); *H01M 10/425* (2013.01);
(Continued)

(58) Field of Classification Search
None
See application file for complete search history.

(56) References Cited

U.S. PATENT DOCUMENTS 6,919,938 B2    7/2005    Choi et al.
8,197,959 B2    6/2012    Ro et al.
(Continued)

FOREIGN PATENT DOCUMENTS

CN    1387076 A    12/2002
CN    001659722 A    8/2005
(Continued)

OTHER PUBLICATIONS

International Search Report dated Nov. 20, 2018 for PCT/KR2018/009406.
(Continued)

*Primary Examiner* — Nathanael T Zemui
(74) *Attorney, Agent, or Firm* — Lee IP Law, P.C.

(57) ABSTRACT

Provided is a battery pack. The battery pack includes: a battery cell; a protective circuit module electrically connected to an electrode tab extending from the battery cell; and a frame including a frame main body and a first pressing rib, wherein the frame main body forms a cell accommodation portion configured to accommodate the battery cell, and the first pressing rib protrudes from the frame main body in a direction opposite the cell accommodation portion to press the electrode tab and the protective circuit module in a direction in which the electrode tab and the protective circuit module face each other.

According to the present disclosure, the battery pack has an improved structure for easily electrically connecting the battery cell and the protective circuit module to each other.

17 Claims, 11 Drawing Sheets

(51) Int. Cl.
*H01M 10/42* (2006.01)
*H01M 50/202* (2021.01)
*H01M 50/264* (2021.01)
*H01M 50/271* (2021.01)
*H01M 50/287* (2021.01)
*H01M 50/291* (2021.01)
*H01M 50/516* (2021.01)
*H01M 50/519* (2021.01)
*H01M 50/529* (2021.01)
*H01M 50/211* (2021.01)
*H01M 50/502* (2021.01)
*H01M 50/536* (2021.01)
*H01M 50/54* (2021.01)

(52) U.S. Cl.
CPC ....... *H01M 50/202* (2021.01); *H01M 50/264* (2021.01); *H01M 50/271* (2021.01); *H01M 50/287* (2021.01); *H01M 50/291* (2021.01); *H01M 50/516* (2021.01); *H01M 50/519* (2021.01); *H01M 50/529* (2021.01); *H01M 50/211* (2021.01); *H01M 50/502* (2021.01); *H01M 50/536* (2021.01); *H01M 50/54* (2021.01); *Y02E 60/10* (2013.01)

(56) References Cited

U.S. PATENT DOCUMENTS

| | | |
|---|---|---|
| 8,518,569 B2 | 8/2013 | Murphy et al. |
| 8,691,429 B2 | 4/2014 | Kim et al. |
| 8,784,129 B2 | 7/2014 | Ogasawara et al. |
| 9,041,350 B2 | 5/2015 | Bang et al. |
| 9,112,204 B2 | 8/2015 | Bang et al. |
| 9,209,429 B2 | 12/2015 | Lee |
| 9,601,813 B2 | 3/2017 | Lee |
| 9,929,442 B2 | 3/2018 | Ahn et al. |
| 2005/0037259 A1 | 2/2005 | Maruyama |
| 2010/0092859 A1* | 4/2010 | Kim ............... H01M 50/20 156/60 |
| 2011/0008653 A1 | 1/2011 | Yoon et al. |
| 2011/0210954 A1 | 9/2011 | Murphy et al. |
| 2013/0164570 A1* | 6/2013 | Bang ............ H01M 50/522 429/7 |
| 2014/0193670 A1 | 7/2014 | Ahn |
| 2016/0276647 A1 | 9/2016 | Lee et al. |

FOREIGN PATENT DOCUMENTS

| | | |
|---|---|---|
| CN | 101728580 A | 6/2010 |
| CN | 102195011 A | 9/2011 |
| CN | 102668226 A | 9/2012 |
| CN | 102986055 A | 3/2013 |
| CN | 103227303 A | 7/2013 |
| CN | 103928644 A | 7/2014 |
| CN | 103972441 A | 8/2014 |
| KR | 10-2005-0003443 A | 1/2005 |
| KR | 10-0700277 B1 | 3/2007 |
| KR | 10-2009-0002719 A | 1/2009 |
| KR | 10-2010-0041689 A | 4/2010 |
| KR | 10-2011-0005581 A | 1/2011 |
| KR | 10-2012-0136379 A | 12/2012 |
| KR | 10-2014-0096197 A | 8/2014 |
| KR | 2014-0100109 A | 8/2014 |
| KR | 10-1539691 B1 | 7/2015 |
| KR | 10-2016-0037575 A | 4/2016 |
| KR | 10-2016-0111694 A | 9/2016 |
| KR | 10-1684349 B1 | 12/2016 |

OTHER PUBLICATIONS

Korean Office action dated Apr. 28, 2022.
Chinese Office Action issued Jun. 19, 2023, for corresponding CN Patent Application No. 201880070736.2.

* cited by examiner

BATTERY PACK

CROSS REFERENCE TO RELATED APPLICATIONS

This is the U.S. national phase application based on PCT/KR2018/009406, filed Aug. 16, 2018, which is based on Korean Patent Application No. 10-2017-0142563, filed Oct. 30, 2017, the entire contents of all of which are hereby incorporated by reference.

TECHNICAL FIELD

The present disclosure relates to a battery pack.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules (packs) each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules each including a plurality of batteries (battery cells) to handle problems relating to power and capacity, and the output voltages or currents of battery modules may be increased by adjusting the number of batteries included in each battery module.

DESCRIPTION OF EMBODIMENTS

Technical Problem

An embodiment of the present disclosure includes a battery pack having an improved structure for easily electrically connecting a protective circuit module and battery cells to each other.

Solution to Problem

A battery pack includes:
a battery cell;
a protective circuit module electrically connected to an electrode tab extending from the battery cell; and
a frame including a frame main body and a first pressing rib, wherein the frame main body forms a cell accommodation portion configured to accommodate the battery cell, and the first pressing rib protrudes from the frame main body in a direction opposite the cell accommodation portion to press the electrode tab and the protective circuit module in a direction in which the electrode tab and the protective circuit module face each other.

Advantageous Effects of Disclosure

According to the present disclosure, battery cells and a protective circuit module are brought into tight contact with each other and are firmly fixed to each other by using pressing ribs of a frame in which cell accommodation portions are formed, such that a welding process may be easily performed on the protective circuit module and the battery cells assembled to the frame without using a separate welding jig for fixing the positions of the battery cells and the protective circuit module, thereby making it easy to electrically connect the battery cells to the protective circuit module and guaranteeing secure coupling between the battery cells and the protective circuit module.

BEST MODE

Figure 1:
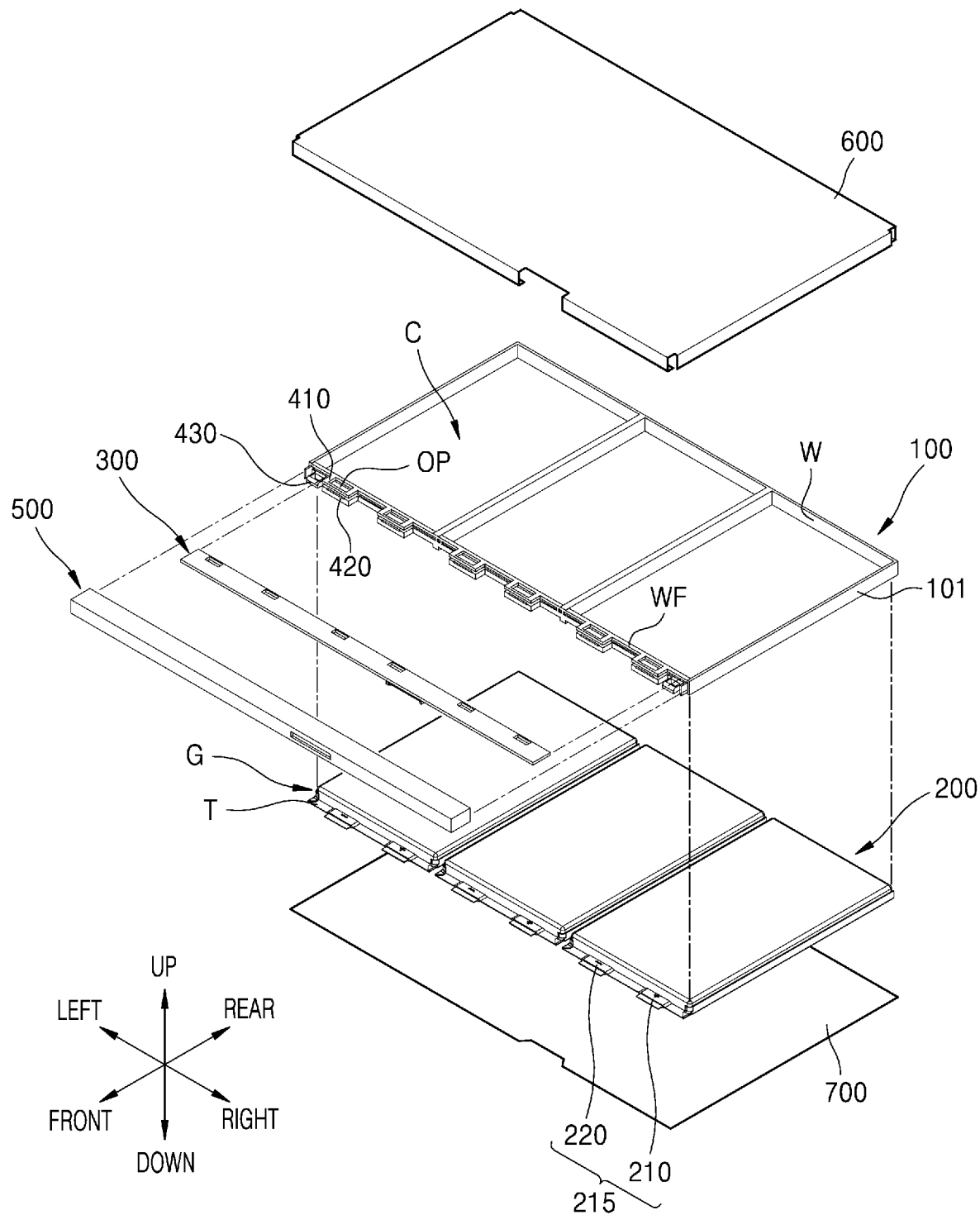
FIG. 1 is an exploded perspective view illustrating a battery pack according to an embodiment of the present disclosure.

A battery pack of the present disclosure includes:
a battery cell;
a protective circuit module electrically connected to an electrode tab extending from the battery cell; and
a frame including a frame main body and a first pressing rib, wherein the frame main body forms a cell accommodation portion configured to accommodate the battery cell, and the first pressing rib protrudes from the frame main body in a direction opposite the cell accommodation portion to press the electrode tab and the protective circuit module in a direction in which the electrode tab and the protective circuit module face each other.

For example, an opening may be formed in the first pressing rib for coupling between the electrode tab and the protective circuit module.

For example, the first pressing rib may have a rim shape surrounding the opening.

For example, a circuit accommodation space may be formed above a terrace of the battery cell to accommodate the protective circuit module and the first pressing rib,
the electrode tab extending from the terrace may overlap the protective circuit module placed above the terrace, and
the first pressing rib may be configured to press downward the electrode tab and the protective circuit module which overlap each other.

For example, the first pressing rib may be configured to press downward the electrode tab and the protective circuit module from an upper side of the electrode tab and the protective circuit module.

For example, the frame further may include a second pressing rib formed at a position facing the first pressing rib and configured to press the electrode tab and the protective circuit module in the direction in which the electrode tab and the protective circuit module face each other in a state in which the electrode tab and the protective circuit module are arranged between the first pressing rib and the second pressing rib.

For example, the first and second pressing ribs may face each other in a thickness direction of the frame,
   the first pressing rib may be formed at an upper position relatively close to the protective circuit module, and
   the second pressing rib may be formed at a lower position relatively close to the electrode tab.

For example, a circuit accommodation space may be formed above a terrace of the battery cell to accommodate the protective circuit module and the first and second pressing ribs arranged with the protective circuit module therebetween, and
   the electrode tab extending from the terrace may extend from a lower surface of the second pressing rib to an upper surface of the second pressing rib while surrounding the second pressing rib, and may overlap the protective circuit module above the upper surface of the second pressing rib.

For example, the first pressing rib may have a rim shape surrounding an opening which is formed for coupling between the electrode tab and the protective circuit module, and
   the second pressing rib may have a solid plate shape not including an opening.

For example, the first and second pressing ribs may protrude side by side from the frame main body in the direction opposite the cell accommodation portion.

For example, the electrode tab may include first and second electrode tabs extending from the battery cell and having different polarities, and
   the first and second pressing ribs may include two pair of first and second pressing ribs per cell accommodation portion.

For example, the first and second pressing ribs may include a plurality of pairs of first and second pressing ribs which are spaced apart from each other along a partition wall of the frame main body, the partition wall facing the cell accommodation portion.

For example, the battery pack may further include a protective circuit module cover coupled to the frame to accommodate the protective circuit module.

For example, the protective circuit module cover may include a first coupling protrusion configured to be coupled to an opening of the first pressing rib.

For example, the battery pack may further include a fastening rib protruding side by side with the first and second pressing ribs from the frame main body,
   wherein the protective circuit module cover may further include a second coupling protrusion configured to be coupled to the fastening rib.

For example, the protective circuit module cover may include: an open portion to accommodate the protective circuit module; and an upper surface portion, a lower surface portion, a left surface portion, a right surface portion, and a front surface portion to cover five different surfaces of the protective circuit module,
   wherein the first and second coupling protrusions may be respectively formed on the upper surface portion and the lower surface portion.

For example, the first pressing rib and the second pressing rib may be respectively formed at an upper position relatively close to the protective circuit module and a lower position relatively close to the electrode tab, and
   the fastening rib may be formed at a lower position side by side with the second pressing rib.

For example, the fastening rib may be formed outside the second pressing rib which is formed at an outermost position along a partition wall of the frame main body, the partition wall facing the cell accommodation portion.

Mode of Disclosure

Hereinafter, battery packs will be described according to preferred embodiments of the present disclosure with reference to the accompanying drawings.

Figure 2:
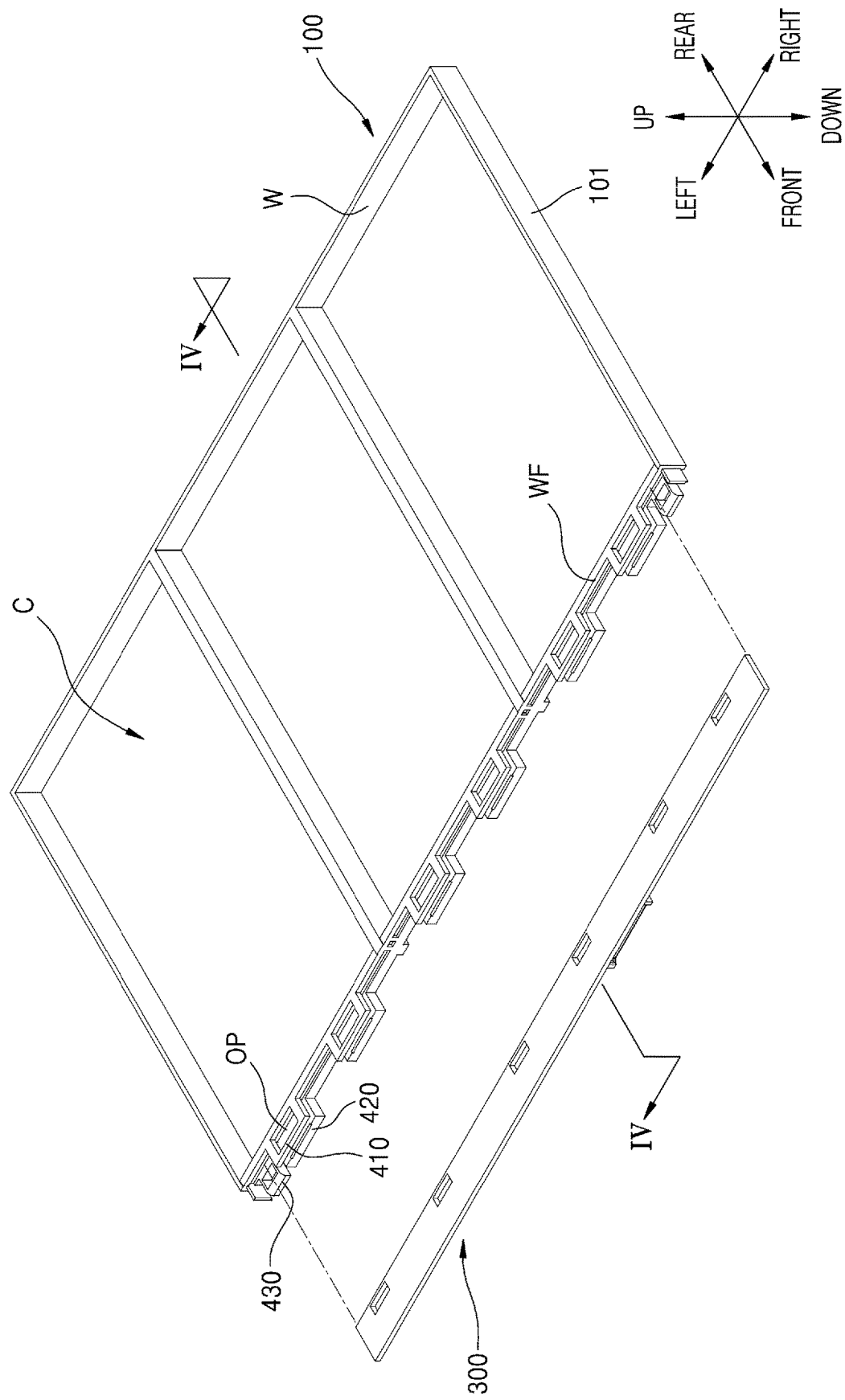
FIG. 2 is a perspective view illustrating a coupled state of a frame and a protective circuit module shown in FIG. 1.
Figure 3:
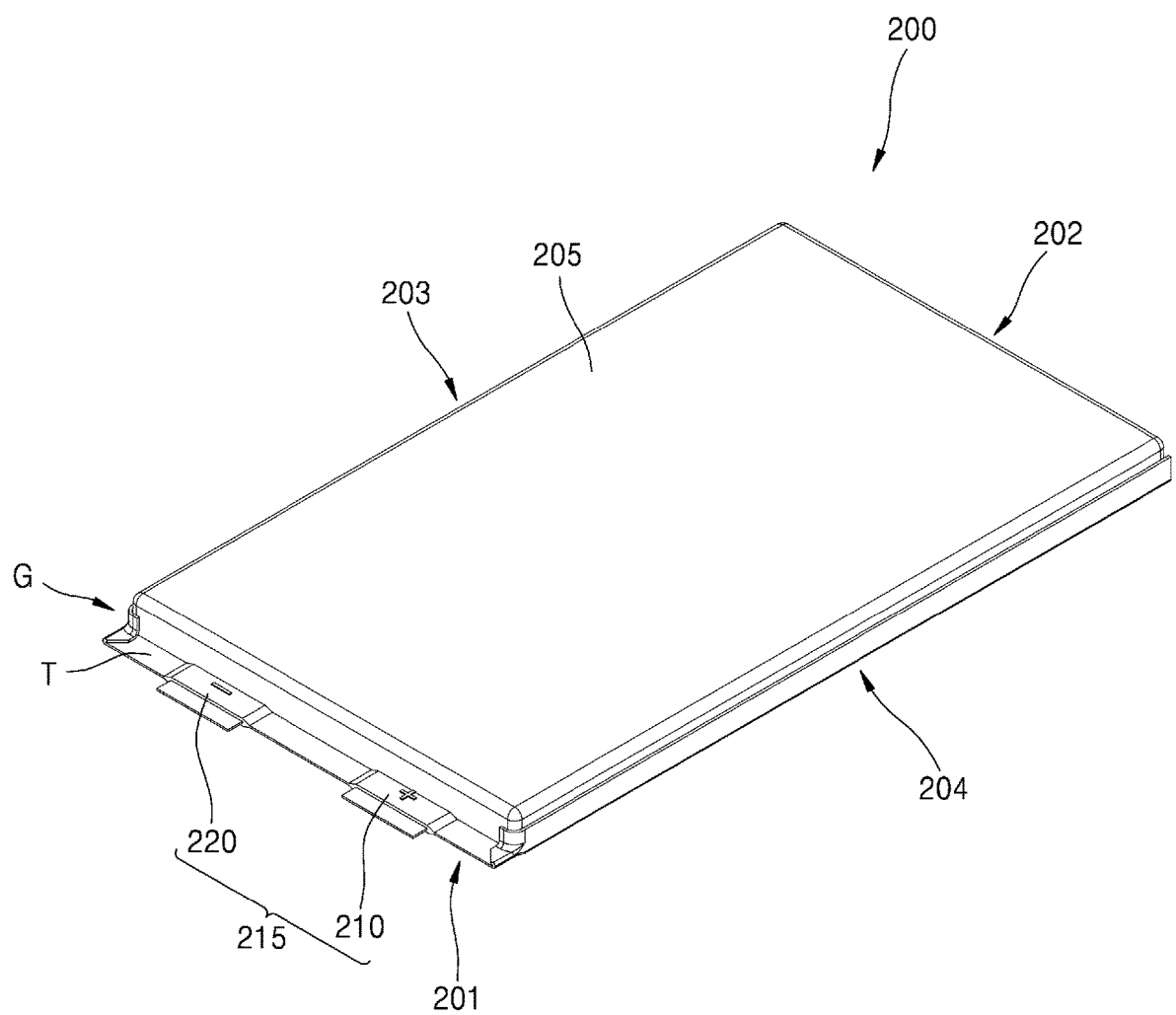
FIG. 3 is a perspective view illustrating a battery cell shown in FIG. 1.
Figure 4:
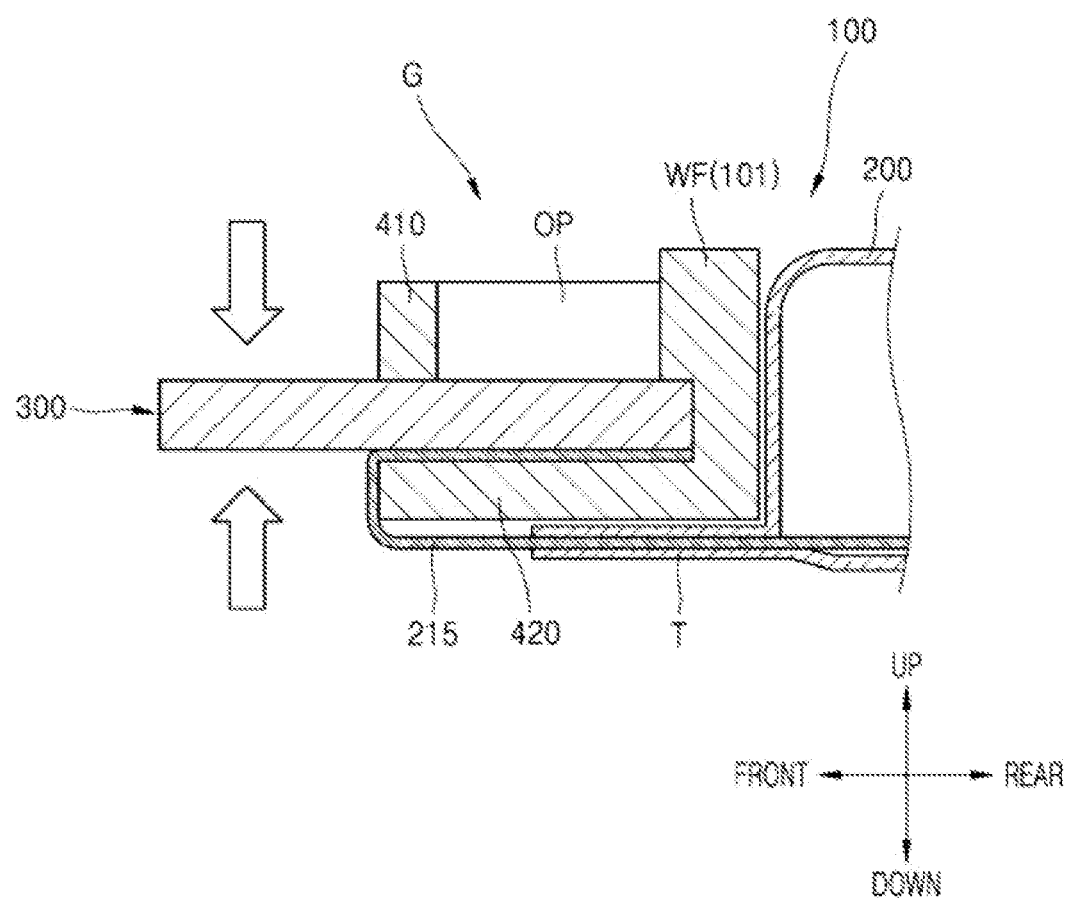
FIG. 4 is a cross-sectional view taken along line VI-VI of FIG. 2.

FIG. 1 is an exploded perspective view illustrating a battery pack according to an embodiment of the present disclosure. FIG. 2 is a perspective view illustrating a coupled state of a frame and a protective circuit module shown in FIG. 1. FIG. 3 is a perspective view illustrating a battery cell shown in FIG. 1. FIG. 4 is a cross-sectional view taken along line VI-VI of FIG. 2.

Referring to FIG. 1, the battery pack of the present disclosure includes battery cells 200, a frame 100 accommodating the battery cells 200, and a protective circuit module 300 supported on the frame 100.

Referring to FIG. 3, each of the battery cells 200 may include an electrode assembly (not shown) and a pouch 205 for sealing the electrode assembly (not shown).

The electrode assembly (not shown) may be manufactured by: forming a stack including a positive electrode plate (not shown) coated with a positive electrode active material, a negative electrode plate (not shown) coated with a negative electrode active material, and a separator (not shown) arranged between the positive and negative electrode plates; and winding the stack in the form of a jelly roll. Alternatively, the electrode assembly (not shown) may be manufactured by sequentially and repeatedly stacking a positive electrode plate (not shown), a separator (not shown), and a negative electrode plate (not shown).

Each of the battery cells 200 may include first and second electrode tabs 210 and 220 having different polarities electrically connected to the electrode assembly (not shown). The first and second electrode tabs 210 and 220 may extend outward through a side of the battery cell 200 and may be electrically connected to the protective circuit module 300 as described later.

In the present disclosure, the first and second electrode tabs 210 and 220 may be collectively referred as an electrode tab 215. For example, the electrode tab 215 may be a term referring to one of the first and second electrode tabs 210 and 220 or both of the first and second electrode tabs 210 and 220.

Each of the battery cells 200 may be formed in a substantially hexahedral shape which includes two main surfaces including one surface and the other opposite surface, and side portions 201, 202, 203, and 204 between the two main surfaces.

More specifically, the side portions 201, 202, 203 and 204 of each of the battery cells 200 may include a first side portion 201 through which the electrode tabs 210 and 220 extend, a second side portion 202 which is opposite the first side portion 201, and third and fourth side portions 203 and 204 extending side by side between the first and second side portions 201 and 202.

For example, a terrace T through which the electrode tab 215 extends may be formed on the first side portion 201 of the battery cell 200. For example, the terrace T may be formed adjacent to a bottom surface of the battery cell 200, and a circuit accommodation space G may be formed above the terrace T to accommodate the protective circuit module 300.

As shown in FIG. 1, in the circuit accommodating space G provided above the terraces T of the battery cells 200, first and second pressing ribs 410 and 420 may be accommodated together with the protective circuit module 300 to fix the protective circuit module 300 by inserting the protective circuit module 300 between the first and second pressing ribs 410 and 420. This will be described later in more detail.

The protective circuit module 300 may measure state variables such as temperatures, voltages, or currents of the battery cells 200 for monitoring the operations of the battery cells 200 and may function as a control unit for controlling the charge and discharge operations of the battery cells 200 according to results of monitoring.

For example, discharge current collected from the battery cells 200 may be input to the protective circuit module 300 and then may be connected to a set device (not shown). To this end, the protective circuit module 300 may be provided with a connection member (not shown) or a connector (not shown) for electrical connection with the set device (not shown).

The frame 100 may form the overall skeleton of the battery pack and may support the battery cells 200 and the protective circuit module 300 to structurally bind the battery cells 200 and the protective circuit module 300 to each other. The frame 100 may support at least two battery cells 200 together. The frame 100 may include partition walls W extending between the battery cells 200 neighboring each other to prevent interference between the battery cells 200, and may provide cell accommodation portions C, surrounded by the partition walls W, respectively for the battery cells 200.

In the embodiments illustrated in the drawings, a plurality of battery cells 200 may be arranged side by side, and the electrode tabs 215 extending from the battery cells 200 may further extend in parallel to each other for electrical connection with the protective circuit module 300 at a front side of the frame 100.

The cell accommodation portions C may be formed in the frame 100 to accommodate the battery cells 200. The cell accommodation portions C may be formed in a hole shape which is open at both upper and lower sides thereof, thereby reducing the thickness and weight of the battery pack.

Referring to FIGS. 1 and 2, the frame 100 may include: a frame main body 101 formed in a rim shape to surround the cell accommodation portions C; and the first and second pressing ribs 410 and 420 protruding from the frame main body 101. For example, the frame main body 101 may include the cell accommodation portions C surrounding the first to fourth side portions 201, 202, 203, and 204 of the battery cells 200, and the first and second pressing ribs 410 and 420 may protrude side by side from the frame main body 101 in a direction opposite the cell accommodation portions C. For example, the first and second pressing ribs 410 and 420 may protrude side by side in a direction opposite the cell accommodation portions C from a front partition wall WF of the frame main body 101 which face the cell accommodation portions C.

The first and second pressing ribs 410 and 420 may be formed on the front side of the frame 100 which corresponds to the terraces T of the battery cells 200, and may fix the position of the protective circuit module 300 by pressing the protective circuit module 300 which is inserted between the first and second pressing ribs 410 and 420. As described later, the protective circuit module 300 and the electrode tabs 215 may be inserted together between the first and second pressing ribs 410 and 420, and the positions of the protective circuit module 300 and the electrode tabs 215 may be fixed in a state in which the protective circuit module 300 and the electrode tabs 215 are in tight contact with each other.

For example, the first and second pressing ribs 410 and 420 may sandwich the protective circuit module 300 therebetween and may fix the position of the protective circuit module 300 in a vertical direction or in the thickness direction of the frame 100. Since the protective circuit module 300 is electrically coupled to the electrode tabs 215 extending from the battery cells 200, the electrical coupling between the protective circuit module 300 and the battery cells 200 may be stably maintained by securely fixing the position of the protective circuit module 300 using the first and second pressing ribs 410 and 420.

Since the protective circuit module 300 and the electrode tabs 215 electrically coupled to the protective circuit module 300 are fixed as the protective circuit module 300 and the electrode tabs 215 are inserted between the first and second pressing ribs 410 and 420, the coupling positions between the protective circuit module 300 and the electrode tabs 215 may be securely fixed, and coupling work such as welding may be easily performed between the protective circuit module 300 and the electrode tabs 215.

For example, the first and second pressing ribs 410 and 420 may be formed at positions facing each other in a vertical direction to fix the positions of the protective circuit module 300 and the electrode tabs 215 in the vertical direction. For example, the vertical direction may refer to the thickness direction of the frame 100 or a direction in which the battery cells 200 are inserted into the cell accommodation portions C of the frame 100.

Referring to FIGS. 2 and 4, the first and second pressing ribs 410 and 420 may be formed at positions facing each other in the vertical direction such that the protective circuit module 300 and the electrode tabs 215 may be inserted between the first and second pressing ribs 410 and 420. The first pressing ribs 410 of the first and second pressing ribs 410 and 420 may be formed above the protective circuit module 300, and the second pressing ribs 420 of the first and second pressing ribs 410 and 420 may be formed under the protective circuit module 300.

The first pressing ribs 410 may be formed above the protective circuit module 300, and may include openings OP for coupling between the protective circuit module 300 and the electrode tabs 215. More specifically, the first pressing ribs 410 may be formed in a rim shape surrounding the openings OP. For example, through the openings OP of the first pressing ribs 410, a welding electrode (not shown) such as a welding rod may approach the protective circuit module 300 and the electrode tabs 215 which overlap each other, and thus welding may be easily performed between the protective circuit module 300 and the electrode tabs 215.

In an embodiment of the present disclosure, laser welding may be performed between the protective circuit module 300 and the electrode tabs 215, and since the openings OP of the first pressing ribs 410 allow radiation of a laser beam to the protective circuit module 300 and the electrode tabs 215, the laser welding may be easily performed. That is, the openings OP of the first pressing ribs 410 allow the approach of a coupling tool such as a welding electrode (not shown) or the radiation of a laser beam in a non-contact coupling process such as a laser welding process, thereby facilitating the coupling between the protective circuit module 300 and the electrode tabs 215. In this case, the approach of a coupling tool or the radiation of a laser beam may occur in an up-to-down direction of the first pressing ribs 410, and the up-to-down direction of the first pressing ribs 410 may correspond to the direction in which the protective circuit module 300 and the electrode tabs 215 are coupled to each other.

The second pressing ribs 420 may be formed under the protective circuit module 300, and unlike the first pressing rib 410, the second pressing ribs 420 may be formed in a solid plate shape including no opening. The second pressing ribs 420 may be formed in a plate shape under the protective circuit module 300 and the electrode tabs 215, and may stably support the coupling positions of the protective circuit module 300 and the electrode tabs 215 from an opposite side in the coupling direction.

Referring to FIG. 4, the first and second pressing ribs 410 and 420 may be positioned above the terrace T of each of the battery cells 200 from which the electrode tab 215 extends. The circuit accommodating space G is formed above the terrace T of each of the battery cells 200 to accommodate the protective circuit module 300, and the first and second pressing ribs 410 and 420 may be accommodated in the circuit accommodating space G together with the protective circuit module 300.

In other words, the terraces T of the battery cells 200 from which the electrode tabs 215 extend may be arranged below the second pressing ribs 420 which are lower ribs of the first and second pressing ribs 410 and 420. The electrode tabs 215 extending from the terraces T of the battery cells 200 may extend from lower portions of the second pressing ribs 420 to upper portions of the second pressing ribs 420 while surrounding the second pressing ribs 420 and may then be inserted between the protective circuit module 300 and the second pressing ribs 420. For example, the electrode tabs 215 extending from the terraces T of the battery cells 200 may be bent from lower surfaces of the second pressing ribs 420 to upper surfaces of the second pressing ribs 420 to surround the second pressing ribs 420 provided above the terraces T, and may then be brought into contact with the protective circuit module 300 above the upper surfaces of the second pressing ribs 420. In this case, each of the electrode tabs 215 may be bent at two different positions and may thus be varied in the extension direction thereof such that the electrode tabs 215 may extend from the lower surfaces to the upper surfaces of the second pressing ribs 420 to surround the second pressing ribs 420.

The protective circuit module 300 and the electrode tabs 215 may be arranged between the first and second pressing ribs 410 and 420 in a state in which the protective circuit module 300 is placed at an upper position relatively close to the first pressing ribs 410 and the electrode tabs 215 are placed at lower positions relatively close to the second pressing ribs 420. In addition, the protective circuit module 300 and the electrode tabs 215 may be welded together by emitting a laser beam in a coupling direction through the openings OP of the first pressing ribs 410 to the protective circuit module 300 and the electrode tabs 215 in a state in which the protective circuit module 300 and the electrode tabs 215 are in contact with each other between the first and second pressing ribs 410 and 420.

The first and second pressing ribs 410 and 420 may exert pressing forces in mutually-facing directions such that the protective circuit module 300 and the electrode tabs 215 arranged between the first and second pressing ribs 410 and 420 may be brought into tight contact with each other. For example, pressing forces may be exerted from the first and second pressing ribs 410 and 420 as the protective circuit module 300 and the electrode tabs 215 are press fitted between the first and second pressing ribs 410 and 420. For example, the electrode tabs 215 extending from the terraces T of the battery cells 200 may be bent and inserted between the first and second pressing ribs 410 and 420, and then the protective circuit module 300 may be inserted between the first and second pressing ribs 410 and 420 in a state in which the electrode tabs 215 are inserted between the first and second pressing ribs 410 and 420. At this time, the protective circuit module 300 may be press fitted between the first and second pressing ribs 410 and 420 such that the protective circuit module 300 and the electrode tab 215 may be brought into tight contact with each other.

For example, in an embodiment of the present disclosure, without using a separate welding jig (not shown) for fixing the positions of the protective circuit module 300 and the electrode tabs 215, laser welding is performed by simply emitting a laser beam to the protective circuit module 300 and the electrode tabs 215 which are in tight contact with each other between the first and second pressing ribs 410 and 420, and thus the tight contact between the protective circuit module 300 and the electrode tab 215 by the first and second pressing ribs 410 and 420 may be a precondition for laser welding to guarantee appropriate coupling force between the protective circuit module 300 and the electrode tabs 215. When the protective circuit module 300 and the electrode tabs 215 arranged between the first and second pressing ribs 410 and 420 are not in tight contact with each other, that is, in a non-contact state, the radiation of a laser beam, not involving additional pressurizing, may not guarantee appropriate coupling force between the first and second pressing ribs 410 and 420.

In FIG. 4, each of the electrode tabs 215 extending from the terraces T of the battery cells 200 extends onto the upper surface of the second pressing ribs 420 while directly surrounding the second pressing rib 420, for coupling with the protective circuit module 300. However, this is merely an example for ease of understanding, and the present disclosure is not limited thereto. For example, in another embodiment of the present disclosure, each of the electrode tabs 215 may be coupled to the protective circuit module 300 through another element, such as a lead (not shown) which is connected to the electrode tab 215, and in this case, the lead (not shown) connected to the electrode tab 215 may extend onto the upper surface of the second pressing rib 420 for coupling with the protective circuit module 300. In this regard, each of the electrode tabs 215 of the present disclosure does not only refer to a single element extending from the terrace T of the battery cell 200, but may be understood as a collective term including the electrode tab 215 and any other element electrically connected to the electrode tab 215. For example, when an electrode tab 215 is connected to a lead (not shown) through a protective device (not shown) such as a PTC device, the electrode tab 215 may be understood as a collective term including the electrode tab 215 and the other element, that is, the lead (not shown).

Referring to FIGS. 1 and 2, in an embodiment of the present disclosure, a plurality of first pressing ribs 410 and a plurality of second pressing ribs 420 may be spaced apart from each other along the front partition wall WF of the frame main body 101 which faces the cell accommodation portions C. For example, pairs of first and second pressing ribs 410 and 420 may be formed at upper and lower positions of the frame 100 which face each other, and the number of pairs of first and second pressing ribs 410 and 420 may correspond to the number of the electrode tabs 215. For example, one battery cell 200 from which first and second electrode tabs 210 and 220 extend may be accommodated in each of the cell receiving portions C of the frame 100, and two pairs of first and second pressing ribs 410 and 420 may be formed for each of the cell accommodation portions C. In addition, the first and second pressing ribs 410 and 420 may be formed on the frame 100 provided with the cell accommodation portions C such that two pairs of first and second pressing ribs 410 and 420 may be allocated to each of the cell accommodation portions C.

As described above, the first and second pressing ribs 410 and 420 are provided in pairs at upper and lower positions facing each other, and the pairs of first and second pressing ribs 410 and 420 may be spaced apart from each other along the front partition wall WF of the frame main body 101.

Referring to FIG. 1, an upper cover 600 and a lower cover 700 may be arranged on upper and lower sides of the battery cells 200 accommodated in the cell accommodation portions C of the frame 100. The upper cover 600 and the lower cover 700 may have a function of protecting and insulating the battery cells 200 and the protective circuit module 300 supported on the frame 100 from external environments. The upper cover 600 and the lower cover 700 may be coupled to each other in mutually-facing directions in a state in which the frame 100 accommodating the battery cells 200 and the protective circuit module 300 is placed between the upper cover 600 and the lower cover 700, and coupling portions (not shown) may be formed on edges of the upper cover 600 and the lower cover 700 for coupling between the upper cover 600 and the lower cover 700.

Figure 5:
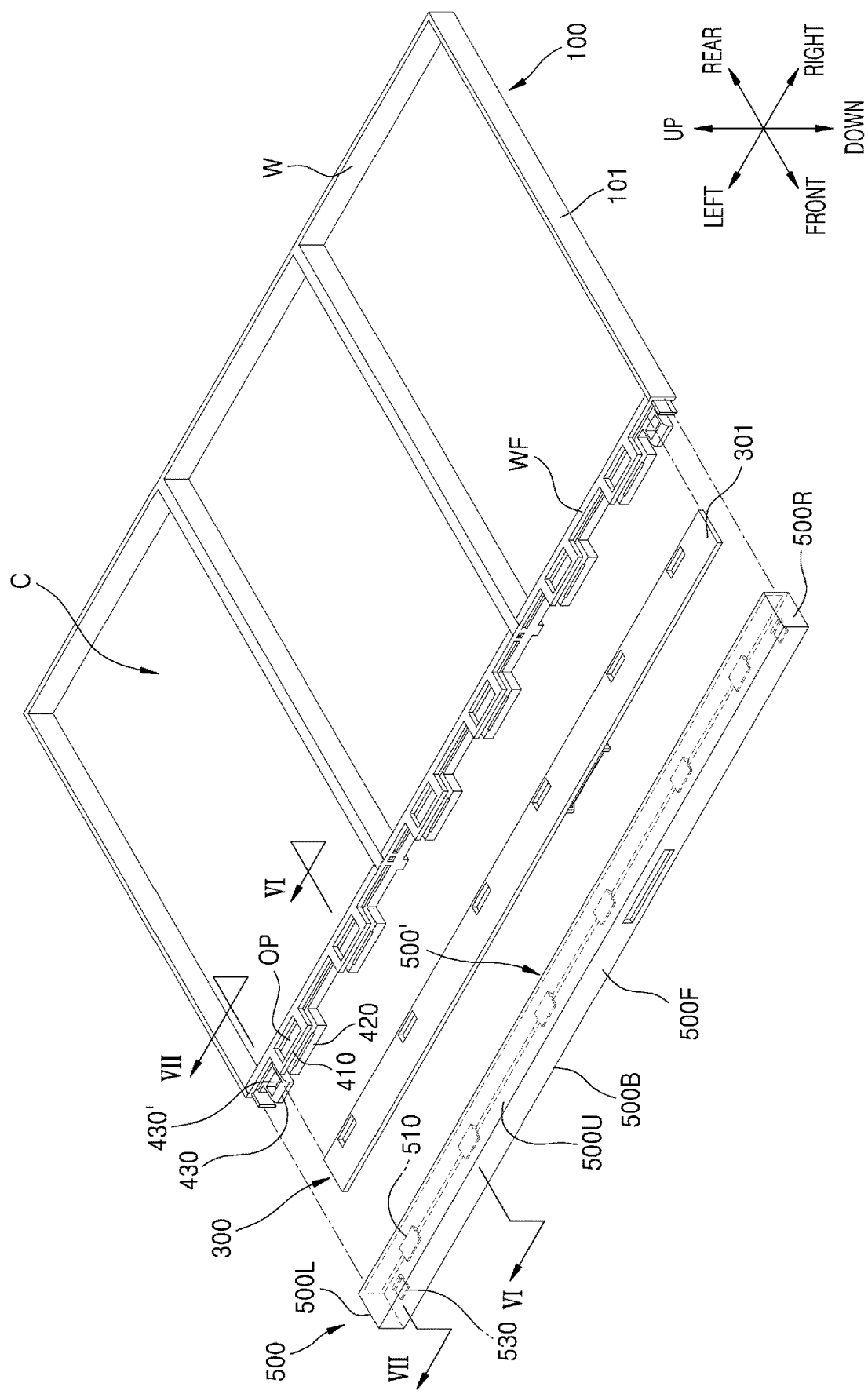
FIG. 5 is a perspective view illustrating a protective circuit module cover shown in FIG. 1.
Figure 6:
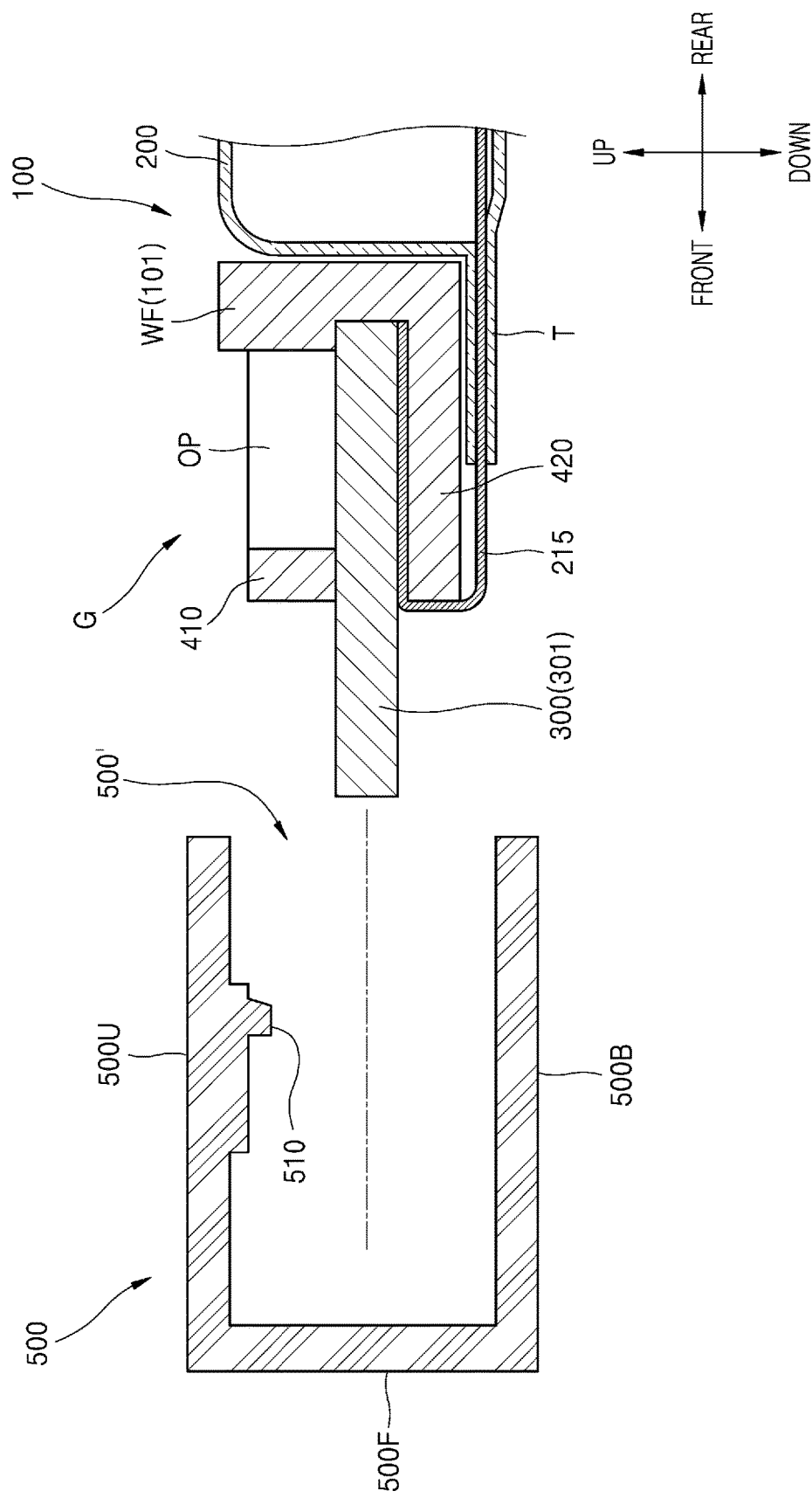
FIG. 6 is a cross-sectional view taken along line VI-VI of FIG. 5.
Figure 7:
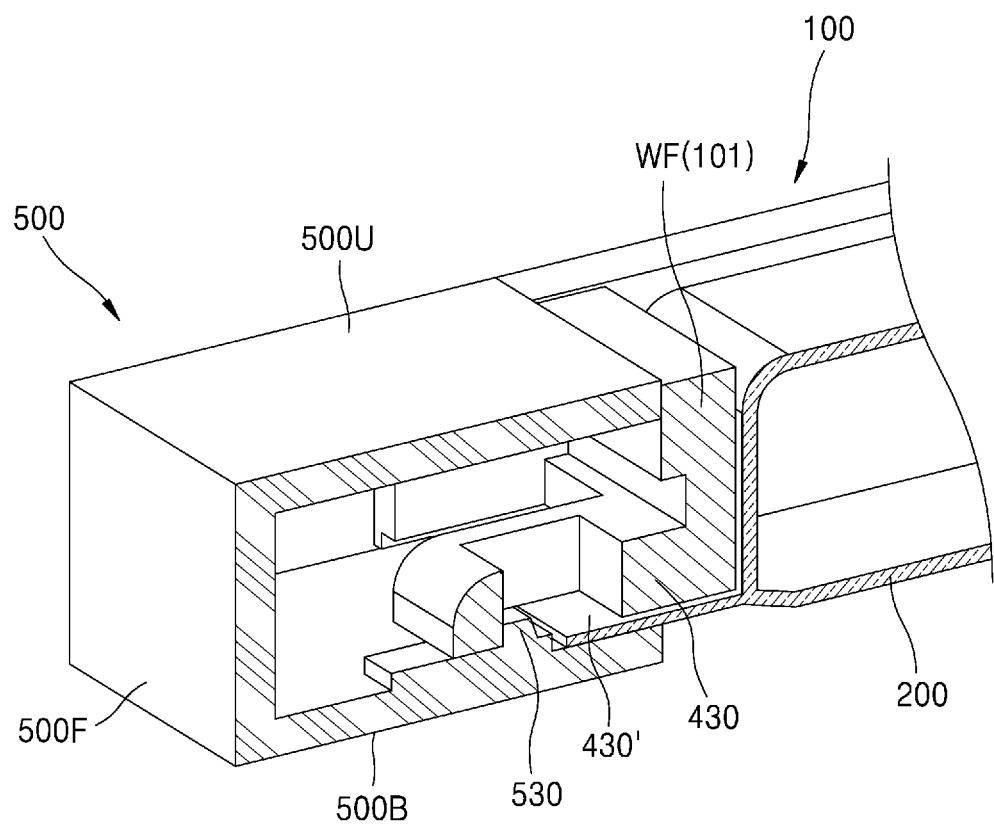
FIG. 7 is a cross-sectional view taken along line VII-VII of FIG. 5.

FIG. 5 is a perspective view illustrating a protective circuit module cover shown in FIG. 1. FIG. 6 is a cross-sectional view taken along line VI-VI of FIG. 5. FIG. 7 is a cross-sectional view taken along line VII-VII of FIG. 5.

Referring to FIG. 5, the position of the protective circuit module 300 may be fixed to the front side of the frame 100 as being assembled between the first and second pressing ribs 410 and 420. In addition, a protective circuit module cover 500 may be coupled to the front side of the frame 100 to accommodate the protective circuit module 300. The protective circuit module cover 500 may be coupled to the first pressing ribs 410 while accommodating the protective circuit module 300 such that the protective circuit module cover 500 may protect the protective circuit module 300 from external environments and may electrically insulate the protective circuit module 300. For example, the protective circuit module 300 may include a circuit board 301 and a plurality of electric elements (not shown) mounted on the circuit board 301. The circuit board 301 may form the overall skeleton of the protective circuit module 300, and the shape of the protective circuit module 300 may be generally understood as a hexahedral shape of the circuit board 301.

The protective circuit module cover 500 may cover five surfaces of the protective circuit module 300, that is, upper, lower, front, left and right surfaces of the protective circuit module 300 such that the operation of the protective circuit module 300 may not be disturbed by external environments. For example, the protective circuit module cover 500 may surround the five surfaces of the protective circuit module 300 except for a rear surface of the protective circuit module 300 which faces the frame main body 101, and thus the protective circuit module 300 may be protected and insulated from external environments.

Since the rear surface of the protective circuit module 300 facing the frame main body 101 may be protected by the front partition wall WF of the frame main body 101, the protective circuit module cover 500 may be provided to cover the other five surfaces of the protective circuit module 300 which do not face the frame main body 101.

The protective circuit module cover 500 may surround five different surfaces of the protective circuit module 300, and to this end, the protective circuit module cover 500 may include an upper surface portion 500U, a lower surface portion 500B, a left surface portion 500L, a right surface portion 500R, and a front surface portion 500F to surround the five different surfaces of the protective circuit module 300. The rear side of the protective circuit module cover 500 may form an open portion 500' that is open to accommodate the protective circuit module 300, and the protective circuit module cover 500 may be assembled to the frame 100 while accommodating the protective circuit module 300 through the open portion 500' of the protective circuit module cover 500.

Referring to FIG. 6, the protective circuit module cover 500 and the frame 100 may be coupled to each other by coupling the protective circuit module cover 500 to the first pressing ribs 410 of the frame 100. More specifically, the protective circuit module cover 500 may be coupled to the frame 100 through the openings OP formed in the first pressing ribs 410.

The openings OP, which are formed in the first pressing ribs 410 for coupling between the protective circuit module 300 and the electrode tabs 215, may allow the approach of a coupling tool or the radiation of a laser beam for coupling between the protective circuit module 300 and the electrode tabs 215, and thus the coupling between the protective circuit module 300 and the electrode tabs 215 may be easily performed. The openings OP of the first pressing ribs 410 may also be used for coupling between the protective circuit module cover 500 and the frame 100 in addition to being used for coupling between the protective circuit module 300 and the electrode tabs 215.

In more detail, first coupling protrusions 510 may be formed on the protective circuit module cover 500, and the first coupling protrusions 510 may be coupled to the openings OP of the first pressing ribs 410 for coupling between the protective circuit module cover 500 and the frame 100. The first coupling protrusions 510 may be formed at positions facing the openings OP of the first pressing ribs 410. For example, the first coupling protrusions 510 may be formed on an inner side of the upper surface portion 500U of the protective circuit module cover 500. As described above, the protective circuit module cover 500 may be coupled to the openings OP of the first pressing ribs 410 by using the first coupling protrusions 510 formed on the upper surface portion 500U.

Referring to FIG. 7, the protective circuit module cover 500 may include second coupling protrusions 530 formed on the lower surface portion 500B facing the upper surface portion 500U. As described above, the coupling force between the protective circuit module cover 500 and the frame 100 may be properly maintained owing to the first and second coupling protrusions 510 and 530 formed on the upper surface portion 500U and the lower surface portion 500B of the protective circuit module cover 500 which face each other. The second coupling protrusions 530 may be coupled to fastening ribs 430 formed on the front side of the frame 100. That is, the first coupling protrusions 510 may be coupled to the first pressing ribs 410 formed at upper positions of the frame 100, and the second coupling protrusions 530 may be coupled to the fastening ribs 430 formed at lower positions of the frame 100. Here, the upper and lower positions of the frame 100 may refer to relatively upper and lower positions on the front side of the frame 100 in the thickness direction of the frame 100, and may correspond to, for example, the positions of the upper surface portion 500U and the lower surface portion 500B of the protective circuit module cover 500. Fastening holes 430' may be formed in the fastening ribs 430 for coupling with the second coupling protrusions 530 of the protective circuit module cover 500.

Referring to FIG. 5, the fastening ribs 430 may be formed on the front side of the frame 100 together with the first and second pressing ribs 410 and 420. All the first and second pressing ribs 410 and 420 and the fastening ribs 430 may protrude side by side in a direction opposite the cell accommodation portions C from the front partition wall WF of the frame main body 101 which faces the cell accommodation portions C. In this case, the first pressing ribs 410 may be formed at upper positions of the frame 100, and the second pressing ribs 420 and the fastening ribs 430 may be formed on the frame 100 at positions lower than the positions of the first pressing ribs 410.

The fastening ribs 430 may be formed side by side with the second pressing ribs 420 at lower positions of the frame 100 which are outside the second pressing ribs 420. Here, the expression "the fastening ribs 430 are formed outside the second pressing rib 420" may indicate that the fastening ribs 430 are formed outside the outermost second pressing ribs 420 formed along the front partition wall WF of the frame main body 101.

For example, the second pressing ribs 420 for fixing the positions of the electrode tabs 215 extending from the battery cells 200 are required to be formed along the partition wall WF of the frame main body 101 at positions corresponding to the electrode tabs 215. The fastening ribs 430 may be formed outside the second pressing ribs 420 such that the fastening ribs 430 may not be between the second pressing ribs 420 and the electrode tabs 215.

In other words, the fastening ribs 430 may be formed at edge positions of the front partition wall WF of the frame main body 101 to avoid the positions at which the first and second pressing ribs 410 and 420 are formed. For example, the first and second pressing ribs 410 and 420 may be paired along the front partition wall WF of the frame main body 101 to face each other at positions corresponding to the electrode tabs 215 of the battery cells 200, and the fastening ribs 430 may be formed at the edge positions of the front partition wall WF of the frame main body 101 to avoid the first and second pressing ribs 410 and 420. For example, the fastening ribs 430 may be formed outside the outermost pairs of first and second pressing ribs 410 and 420 along the front partition wall WF of the frame main body 101.

The fastening ribs 430 are for coupling with the protective circuit module cover 500, and even when the fastening ribs 430 are formed at the edge positions of the frame main body 101, the fastening ribs 430 may be coupled to the protective circuit module cover 500 with sufficient coupling force.

The first and second pressing ribs 410 and 420 may be respectively formed at mutually-facing upper and lower positions according to the thickness of the protective circuit module 300 such that the protective circuit module 300 may be assembled as being inserted between the first and second pressing ribs 410 and 420. The fastening ribs 430 may be formed side by side with the second pressing ribs 420 at lower positions at which the fastening ribs 430 do not obstruct the assembling of the protective circuit module 300.

The first and second coupling protrusions 510 and 530 are respectively formed on the inner sides of the upper surface portion 500U and the lower surface portion 500B of the protective circuit module cover 500, wherein the first coupling protrusions 510 may be coupled to the openings OP of the first pressing ribs 410 which are provided at relatively upper positions, and the second coupling protrusions 530 may be coupled to the fastening holes 430' of the fastening ribs 430 which are provided at relatively lower positions. In this case, since the fastening ribs 430 are formed at lower positions side by side with the second pressing ribs 420, the fastening ribs 430 may not obstruct the insertion of the protective circuit module 300 between the first and second pressing ribs 410 and 420 and may balance in coupling force with the first pressing ribs 410 provided at relatively upper positions, thereby guaranteeing secure coupling between the protective circuit module cover 500 and the frame 100.

Referring to FIG. 4, among the first and second pressing ribs 410 and 420, the first pressing ribs 410 arranged at relatively upper positions provide pressing force in a coupling direction such that the protective circuit module 300 and the electrode tabs 215 may be sufficiently brought into tight contact with each other only by the pressing force exerted by the first pressing ribs 410. Thus, in a structure in which the first pressing ribs 410 press the protective circuit module 300 and the electrode tabs 215 together in a downward coupling direction from an upper side of the protective circuit module 300 and the electrode tabs 215, the second pressing ribs 420 providing pressing force in a direction opposite the coupling direction may be omitted. Hereinafter, a more detailed description will be provided with reference to FIG. 8.

Figure 8:
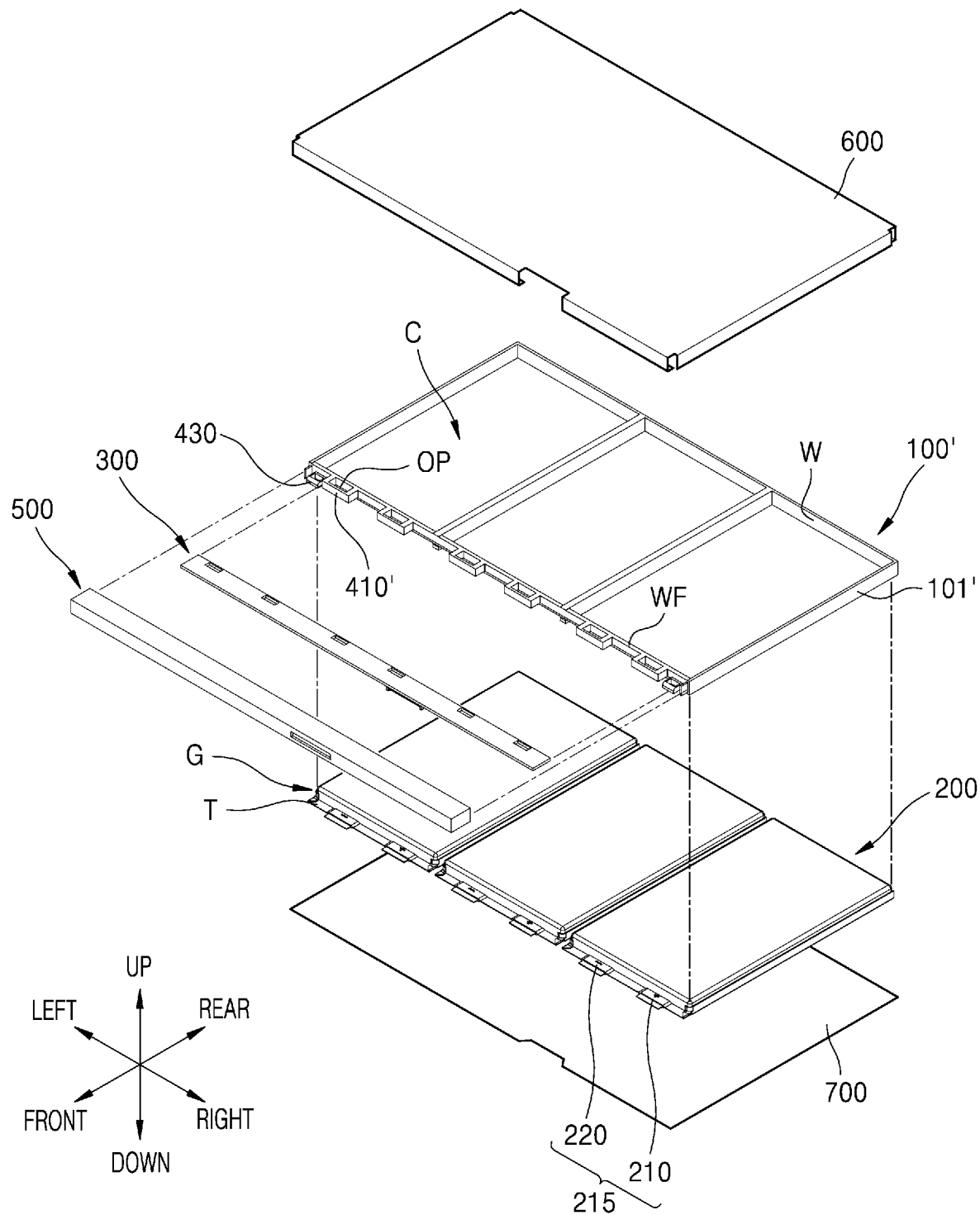
FIG. 8 is an exploded perspective view illustrating a modification of the battery pack of FIG. 1, according to an embodiment.
Figure 9:
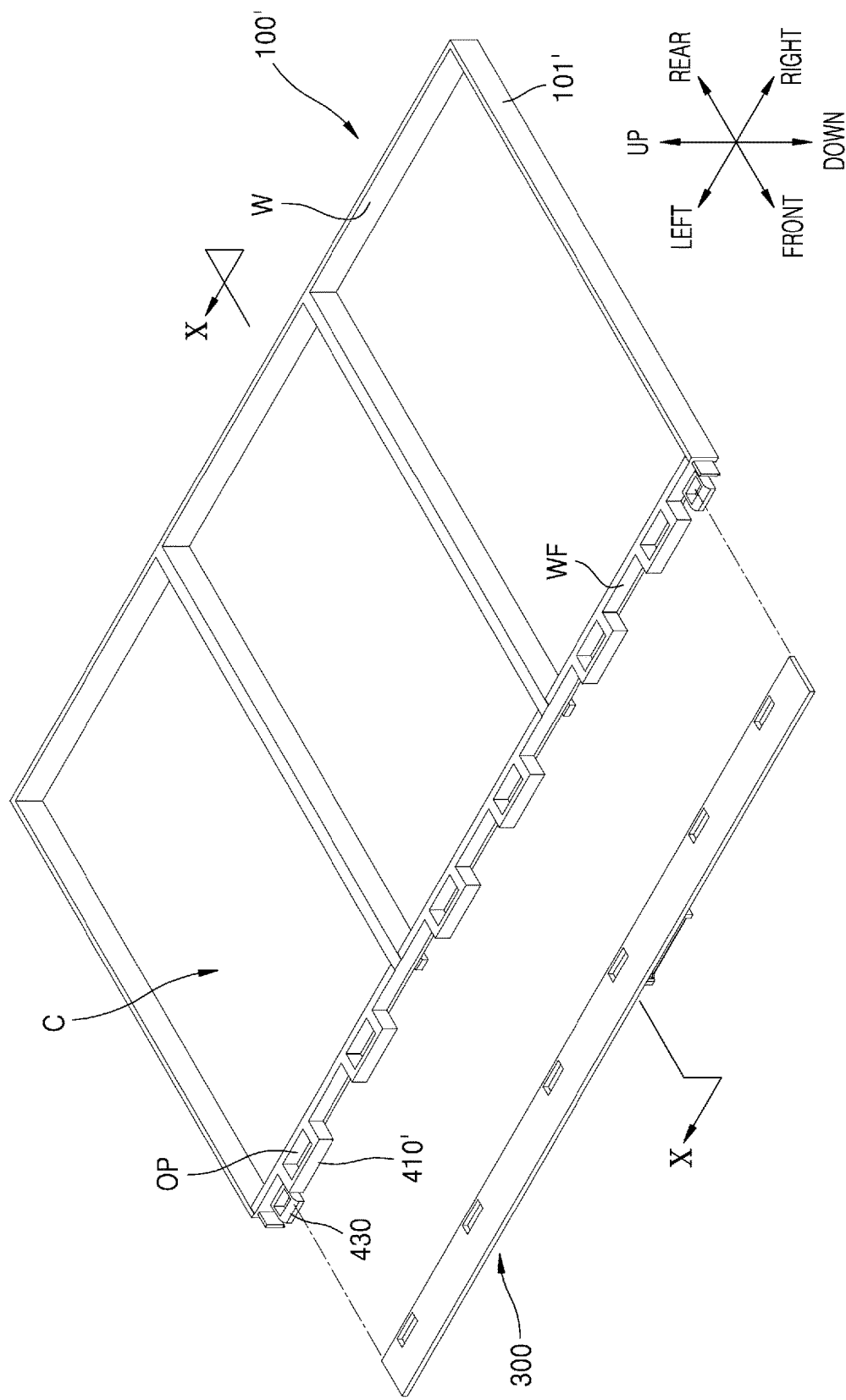
FIG. 9 is a perspective view illustrating a coupled state of a frame and a protective circuit module shown in FIG. 8.
Figure 10:
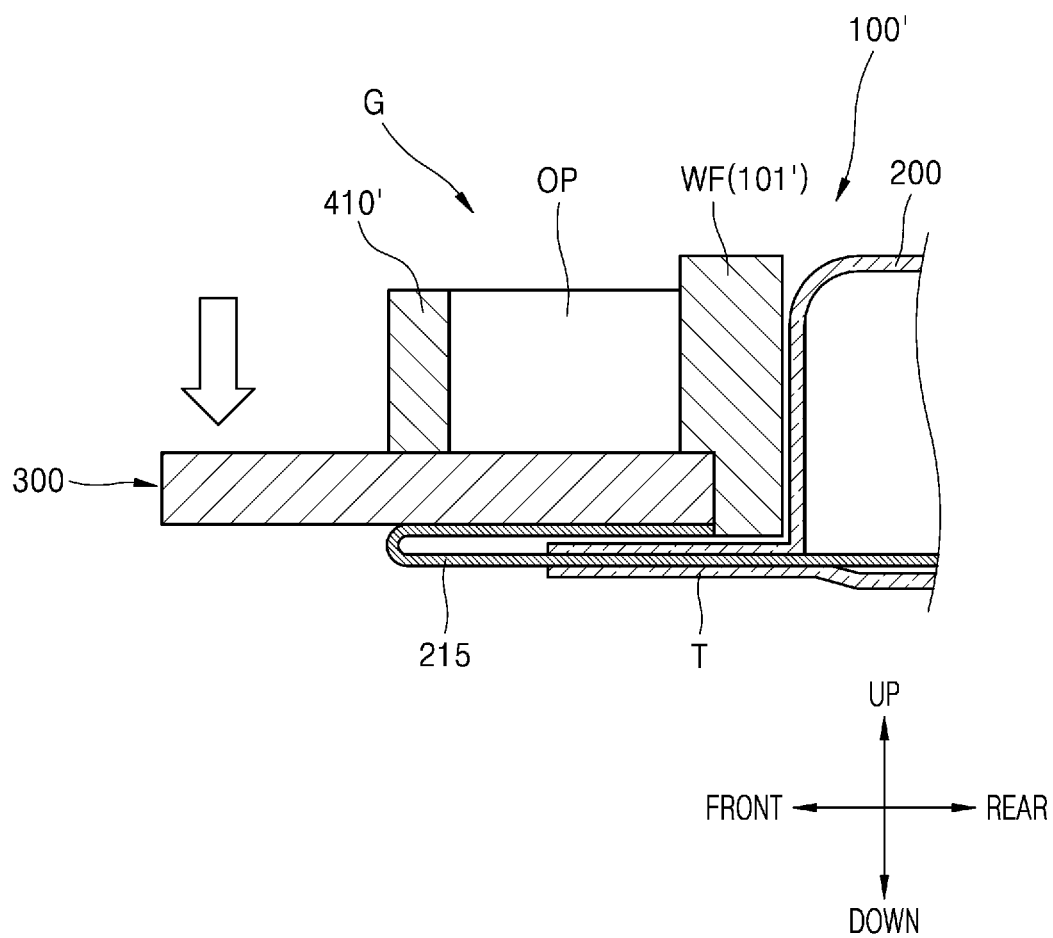
FIG. 10 is a cross-sectional view taken along line X-X of FIG. 9.

FIG. 8 is an exploded perspective view illustrating a modification of the battery pack of FIG. 1, according to an embodiment. FIG. 9 is a perspective view illustrating a coupled state of a frame and a protective circuit module shown in FIG. 8. FIG. 10 is a cross-sectional view taken along line X-X of FIG. 9.

Referring to the drawings, the battery pack includes battery cells 200, a protective circuit module 300 electrically connected to electrode tabs 215 extending from the battery cells 200, and a frame 100', wherein the frame 100' includes: a frame main body 101' in which cell accommodation portions C are formed to accommodate the battery cells 200; and first pressing ribs 410' protruding from the frame main body 101' in a direction opposite the cell accommodation portions C to press the electrode tabs 215 and the protective circuit module 300 in a direction in which the electrode tabs 215 and the protective circuit module 300 face each other.

The battery cells 200 may include terraces T from which the electrode tabs 215 extend, and a circuit accommodation space G may be formed above the terraces T to accommodate the protective circuit module 300. In the circuit accommodating space G, the first pressing ribs 410' may be accommodated together with the protective circuit module 300 to fix the position of the protective circuit module 300.

The cell accommodation portions C may be formed in the frame 100' to accommodate the battery cells 200. In more detail, the frame 100' may include: the frame main body 101' formed in a rim shape to surround the cell accommodation portions C; and the first pressing ribs 410' protruding from the frame main body 101'. The first pressing ribs 410' may protrude in a direction opposite the cell accommodation portions C from a front partition wall WF of the frame main body 101' which faces the cell accommodation portions C of the frame main body 101'.

The first pressing ribs 410' may be formed on a front side of the frame 100' corresponding to the terraces T of the battery cells 200 from which the electrode tabs 215 extend, and may press the electrode tabs 215 and the protective circuit module 300 such that the electrode tabs 215 and the protective circuit module 300 may face each other and make tight contact with each other. The first pressing ribs 410' bring the electrode tabs 215 and the protective circuit module 300 into tight contact with each other in mutually-facing directions such that the electrode tabs 215 and the protective circuit module 300 may be coupled to each other, for example, by simply emitting a laser beam to the electrode tabs 215 and the protective circuit module 300 brought into tight coupled to each other by the first pressing ribs 410' without using an additional welding jig (not shown) for fixing the positions of the electrode tabs 215 and the protective circuit module 300.

Referring to FIG. 10, the first pressing ribs 410' may be formed above the electrode tabs 215 and the protective circuit module 300. That is, the first pressing ribs 410' may be formed above the electrode tabs 215 and the protective circuit module 300 in the thickness direction of the frame 100' and may press the electrode tabs 215 and the protective circuit module 300 in a downward direction such that the electrode tabs 215 and the protective circuit module 300 may be brought into tight contact with each other in mutually-facing directions.

Referring to FIG. 10, the first pressing ribs 410' may be located above the protective circuit module 300 which is placed above the terraces T through which the electrode tabs 215 extend. In this case, the electrode tabs 215 may extend from the terraces T of the battery cells 200 and may overlap the protective circuit module 300 arranged above the terraces T, and the electrode tabs 215 and the protective circuit module 300 which overlap each other may be pressed downward by the first pressing ribs 410' located above the protective circuit module 300.

The frame 100' may be assembled such that the protective circuit module 300 may be placed on the terraces T of the battery cells 200 from the electrode tabs 215 extend, and the first pressing ribs 410' may be placed on the protective circuit module 300. At this time, while assembling the frame 100' on the protective circuit module 300 placed on the terraces T, the battery cells 200 may be inserted into the cell accommodation portions C of the frame 100', and the first pressing ribs 410' may be placed on the protective circuit module 300.

As described above, since the first pressing ribs 410' press the electrode tabs 215 and the protective circuit module 300 downward from the upper side of the electrode tabs 215 and the protective circuit module 300, the electrode tabs 215 and the protective circuit module 300 may be pressed against each other in mutually-facing directions.

In FIG. 10, the electrode tabs 215 extending from the terraces T of the battery cells 200 are bent upward and are then electrically connected to the protective circuit module 300. In another embodiment of the present disclosure, however, the electrode tabs 215 may be electrically connected to the protective circuit module 300 provided above the electrode tabs 215 in a state in which the electrode tabs 215 extend straight from the terraces T of the battery cells 200 and overlap the protective circuit module 300.

Referring to FIG. 10, the electrode tabs 215 extending from the terraces T of the battery cells 200 are directly coupled to the protective circuit module 300. However, this is merely an example for ease of understanding, and the present disclosure is not limited thereto. For example, in another embodiment of the present disclosure, the electrode tabs 215 may be coupled to the protective circuit module 300 through another elements such as leads (not shown) which are connected to the electrode tabs 215, and in this case, the leads (not shown) connected to the electrode tabs 215 may be coupled to the protective circuit module 300. In this regard, each of the electrode tabs 215 of the present disclosure does not only refer to a single element extending from the terrace T of each of the battery cells 200, but may be understood as a collective term including the electrode tab 215 and any other element electrically connected to the electrode tab 215. For example, when the electrode tab 215 is connected to a lead (not shown) through a protective device (not shown) such as a PTC device, the electrode tab 215 may be understood as a collective term including the electrode tab 215 and the other element, that is, the lead (not shown).

Referring to FIGS. 8 and 9, openings OP are formed in the first pressing ribs 410' for coupling between the electrode tabs 215 and the protective circuit module 300, and each of the first pressing ribs 410' may be formed in a rim shape surrounding the opening OP. The first pressing ribs 410' are for pressing the protective circuit module 300 and the electrode tabs 215 in a direction in which the protective circuit module 300 and the electrode tabs 215 face each other, and owing to the openings OP of the first pressing ribs 410', a coupling tool such as a welding electrode (not shown) or radiation of a laser beam in a non-contact coupling process such as a laser welding process is allowed to reach the protective circuit module 300 and the electrode tabs 215 that overlap each other, thereby facilitating the coupling between the protective circuit module 300 and the electrode tabs 215.

The first pressing ribs 410' may be formed at a plurality of positions that are spaced apart from each other along the front partition wall WF of the frame main body 101' which faces the cell accommodation portions C. One battery cell 200 from which first and second electrode tabs 210 and 220 extend may be accommodated in each of the cell receiving portions C of the frame 100', and a pair of first pressing ribs 410 may be formed for each of the cell accommodation portions C. The first pressing ribs 410' may be formed such that a pair of first pressing ribs 410' may be allocated to each of the cell accommodation portions C of the frame 100'.

Figure 11:
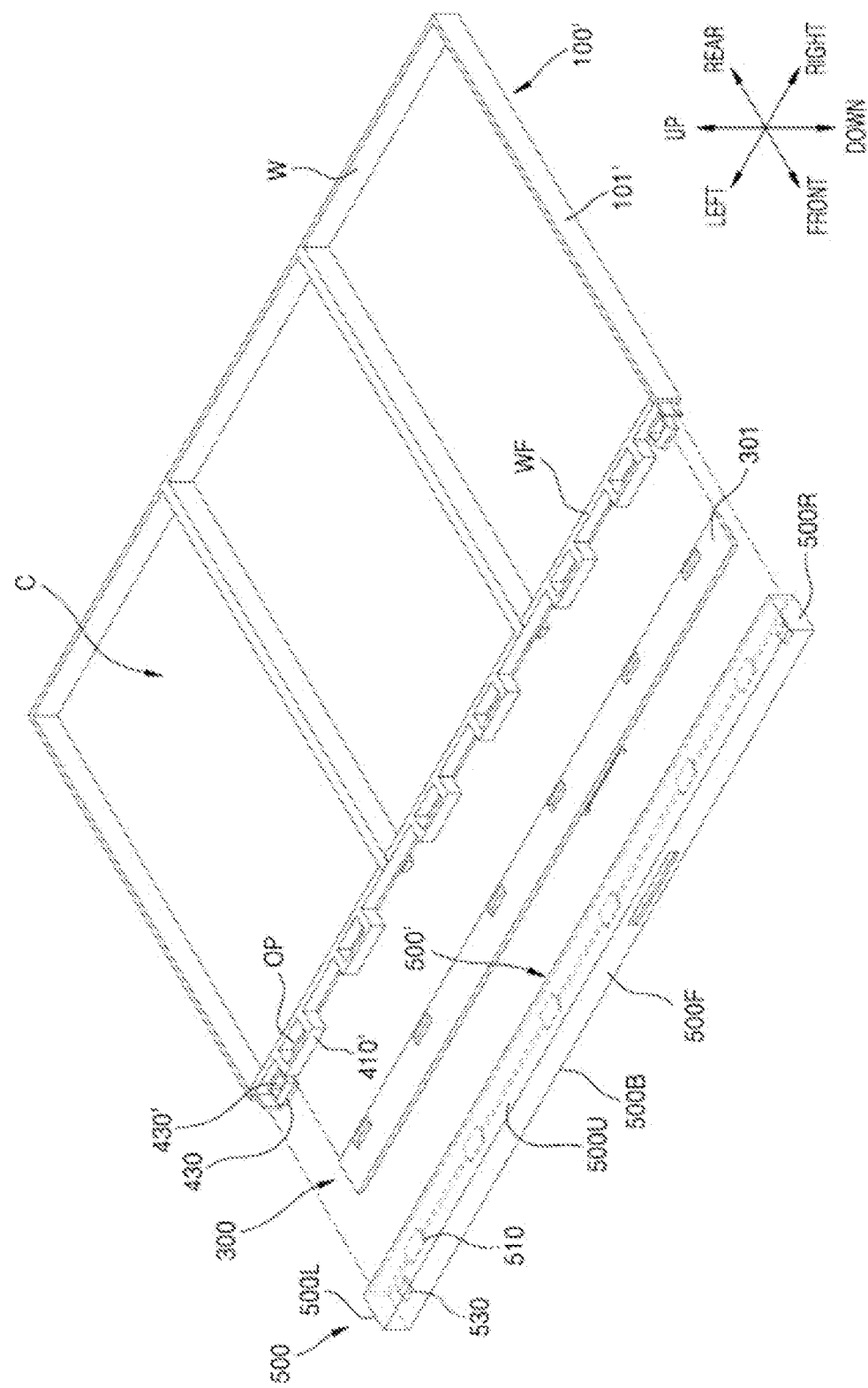
FIG. 11 is a perspective view illustrating a protective circuit module cover shown in FIG. 8.

FIG. 11 is a perspective view illustrating a protective circuit module cover shown in FIG. 8.

Referring to the drawing, the protective circuit module 300 may be positioned on the front side of the frame 100' in a state in which the protective circuit module 300 is brought into tight contact with the electrode tabs 215 by the first pressing ribs 410', and a protective circuit module cover 500 may be coupled to the front side of the frame 100' to accommodate the protective circuit module 300.

The protective circuit module cover 500 includes an upper surface portion 500U, a lower surface portion 500B, a left surface portion 500L, a right surface portion 500R, and a front surface portion 500F to surround five different surfaces of the protective circuit module 300. In this case, first and second coupling protrusions 510 and 530 may be formed on the upper surface portion 500U and the lower surface portion 500B of the protective circuit module cover 500, and the first and second coupling protrusions 510 and 530 may be respectively coupled to the openings OP of the first pressing ribs 410' and fastening holes 430' of fastening ribs 430. The openings OP of the first pressing ribs 410 may be used for coupling between the protective circuit module cover 500 and the frame 100' in addition to being used for coupling between the protective circuit module 300 and the electrode tabs 215. The first pressing ribs 410' and the fastening ribs 430 may extend side by side in a direction opposite the cell accommodation portions C from the partition wall WF of the frame main body 101' which faces the cell accommodation portions C.

The fastening ribs 430 may be formed outside the first pressing ribs 410'. The first pressing ribs 410', which are for fixing the positions of the electrode tabs 215 extending from the battery cells 200, may be formed along the partition wall WF of the frame main body 101' at positions corresponding to the electrode tabs 215, and the fastening ribs 430 may be formed outside of the first pressing ribs 410', that is, at edge positions of the partition wall WF of the frame main body 101' so as not to be inserted between the first pressing ribs 410' and the electrode tabs 215.

The fastening ribs 430 may be formed at relatively lower positions in the thickness direction (vertical direction) of the frame 100'. The fastening ribs 430 may be formed at relatively lower positions to provide balanced fastening force together with the first pressing ribs 410' formed at relatively upper positions.

While embodiments of the present disclosure have been described with reference to the accompanying drawings, the embodiments are for illustrative purposes only, and it will be understood by those of ordinary skill in the art that various modifications and equivalent other embodiments may be made therefrom.

INDUSTRIAL APPLICABILITY

The present disclosure may be applied to battery packs which are rechargeable energy sources, and to various devices using battery packs as power sources.

The invention claimed is:

1. A battery pack, comprising:
   a battery cell;
   a protective circuit module electrically connected to an electrode tab extending from the battery cell; and
   a frame that includes a frame main body, a first pressing rib, and a second pressing rib,
   wherein:
   a circuit accommodation space is disposed above a terrace of the battery cell, the circuit accommodation space accommodating the protective circuit module and the first pressing rib, and the protective circuit module being between the first pressing rib and the terrace,
   the electrode tab extends beyond the terrace and overlaps the protective circuit module located above the terrace,
   the frame main body forms a cell accommodation portion configured to accommodate the battery cell,
   the first pressing rib and the second pressing rib protrude from the frame main body in a direction opposite the cell accommodation portion and substantially perpendicular to a partition wall of the frame main body surrounding the cell accommodation portion,
   the first pressing rib and the second pressing rib are integral with the partition wall of the frame main body,
   the first pressing rib has a rim shape surrounding an opening for coupling between the electrode tab and the protective circuit module,
   the second pressing rib is disposed at a position facing the first pressing rib and substantially parallel to the first pressing rib,
   the second pressing rib has a solid plate shape with no opening therein,
   the first pressing rib and the second pressing rib are spaced apart from each other to permit insertion of the protective circuit module and the electrode tab therebetween, and
   the electrode tab and the protective circuit module are arranged between the first pressing rib and the second pressing rib, such that the first pressing rib and the second pressing rib sandwich the electrode tab and the protective circuit module and press the electrode tab against the protective circuit module.

2. The battery pack of claim 1, wherein the electrode tab is aligned with the opening.

3. The battery pack of claim 2, wherein the first pressing rib completely and continuously encircles the opening.

4. The battery pack of claim 1, wherein:
   the electrode tab extends beyond the terrace and overlaps the protective circuit module placed above the terrace, and
   the first pressing rib is configured to press the electrode tab and the protective circuit module, which overlap each other, towards the terrace.

5. The battery pack of claim 4, wherein the first pressing rib is configured to press downward the electrode tab and the protective circuit module from an upper side of the electrode tab and the protective circuit module.

6. The battery pack of claim 1, wherein:
   the first and second pressing ribs face each other in a thickness direction of the frame,
   the first pressing rib is disposed at an upper position proximate to the protective circuit module, and
   the second pressing rib is disposed at a lower position proximate to the electrode tab.

7. The battery pack of claim 1, wherein:
   the circuit accommodation space is disposed above the terrace of the battery cell, and accommodates the protective circuit module and the first and second pressing ribs arranged with the protective circuit module therebetween, and
   the electrode tab extends beyond the terrace, and wraps around the second pressing rib by extending from a lower surface of the second pressing rib to an upper surface of the second pressing rib, and overlaps the protective circuit module above the upper surface of the second pressing rib.

8. The battery pack of claim 1, wherein the opening provides a space for coupling the electrode tab and the protective circuit module together.

9. The battery pack of claim 1, wherein the first and second pressing ribs protrude side by side from the frame main body in the direction opposite the cell accommodation portion.

10. The battery pack of claim 1, wherein:
    the electrode tab includes first and second electrode tabs extending from the battery cell and having different polarities, and
    the first and second pressing ribs include two pairs of first and second pressing ribs per cell accommodation portion.

11. The battery pack of claim 10, wherein the first and second pressing ribs include a plurality of pairs of first and second pressing ribs which are spaced apart from each other along the partition wall of the frame main body.

12. The battery pack of claim 1, further comprising a protective circuit module cover coupled to the frame to accommodate the protective circuit module.

13. The battery pack of claim 2, further comprising a protective circuit module cover coupled to the frame to accommodate the protective circuit module,
wherein the protective circuit module cover includes a first coupling protrusion that is coupled to the opening of the first pressing rib.

14. The battery pack of claim 13, further comprising a fastening rib protruding side by side with the first and second pressing ribs from the frame main body,
wherein the protective circuit module cover further includes a second coupling protrusion that is coupled to the fastening rib.

15. The battery pack of claim 14, wherein the protective circuit module cover includes:
an open portion that accommodates the protective circuit module; and
an upper surface portion, a lower surface portion, a left surface portion, a right surface portion, and a front surface portion that cover five different surfaces of the protective circuit module,
wherein the first and second coupling protrusions are respectively disposed on the upper surface portion and the lower surface portion.

16. The battery pack of claim 14, wherein the first pressing rib and the second pressing rib are respectively disposed at an upper position proximate to the protective circuit module and a lower position proximate to the electrode tab, and
the fastening rib is disposed at a lower position side by side with the second pressing rib.

17. The battery pack of claim 14, wherein the fastening rib is disposed outside the second pressing rib which is disposed at an outermost position along the partition wall of the frame main body.

* * * * *